United States Patent
Stefanov et al.

(10) Patent No.: US 7,684,644 B2
(45) Date of Patent: Mar. 23, 2010

(54) VARIABLE-LENGTH ENCODING FOR IMAGE DATA COMPRESSION

(75) Inventors: Ekaterina Stefanov, Normanhurst (AU); David Robert James Monaghan, Eastwood (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/335,676

(22) Filed: Dec. 16, 2008

(65) Prior Publication Data

US 2009/0161973 A1   Jun. 25, 2009

(30) Foreign Application Priority Data

Dec. 19, 2008   (AU) .............................. 2007249117

(51) Int. Cl.
 *G06K 9/46*     (2006.01)
 *H04J 3/06*     (2006.01)
(52) U.S. Cl. .................. 382/275; 382/246; 370/520
(58) Field of Classification Search ............ 382/233, 382/245, 246, 275, 232; 340/825.52; 370/401, 370/312, 224, 297, 408, 471, 440, 520, 338, 370/337, 347, 463, 465, 445, 254; 455/62, 455/13.1, 524; 375/222, 240.26, E7.093; 714/4; 369/103; 341/59, 58, 65, 103; 360/39; 709/247

See application file for complete search history.

(56) References Cited

U.S. PATENT DOCUMENTS

| | | | |
|---|---|---|---|
| 5,825,830 A | 10/1998 | Kopf | 375/340 |
| 5,883,633 A | 3/1999 | Gill et al. | 345/431 |
| 6,225,922 B1 | 5/2001 | Norton | 341/87 |
| 6,507,898 B1 * | 1/2003 | Gibson et al. | 711/168 |
| 6,947,592 B2 | 9/2005 | Ishikawa | 382/166 |
| 7,162,077 B2 | 1/2007 | Li | 382/166 |
| 7,483,585 B2 * | 1/2009 | Brakus, Jr. | 382/245 |
| 2001/0021971 A1 * | 9/2001 | Gibson et al. | 712/215 |
| 2006/0115170 A1 | 6/2006 | Brakus Jr. | 382/245 |
| 2008/0144952 A1 | 6/2008 | Chen et al. | 382/239 |
| 2009/0154818 A1 | 6/2009 | Stefanov et al. | 382/239 |

FOREIGN PATENT DOCUMENTS

WO     97/07599     2/1997

* cited by examiner

*Primary Examiner*—Sheela C Chawan
(74) *Attorney, Agent, or Firm*—Fitzpatrick, Cella, Harper & Scinto

(57) ABSTRACT

Disclosed is a variable-length image compression arrangement which represents successive distinct image data values (220, 221) of an image using corresponding non-decreasing Palette values (215, 222), and which incorporates (915, 1025) into the encoded data stream information recording the position in the encoded data stream at which each Palette value bit representation length increase occurs.

13 Claims, 12 Drawing Sheets

VARIABLE-LENGTH ENCODING FOR IMAGE DATA COMPRESSION

CROSS-REFERENCE TO RELATED PATENT APPLICATIONS

This application claims the right of priority under 35 U.S.C. §119 based on Australian Patent Application No. 2007249117, filed 19 Dec. 2007, which is incorporated by reference herein in its entirety as if fully set forth herein.

FIELD OF INVENTION

The invention relates to image compression/decompression and, more particularly, to image compression in a tiled image processing system where memory resources are limited.

BACKGROUND

In colour printing environments the total uncompressed size of a generated pixel image is often large and it is advantageous to avoid storing the entire image uncompressed. Such pixel images are typically generated in raster, band, or block order. In particular data corresponding to pixels, scanlines, groups of scanlines, or tiles, is emitted in a stream from a raster image processor that has as input an object graphic description of the page to be printed. Data to be compressed is often pixel colour values, but could be any other image information, referred to hereafter as image data.

Image data can be compressed either with or without loss of information. Many schemes have been proposed for lossless image compression; some of them are based on entropy encoding, while other methods are dictionary-based. In the latter, raw data is mapped onto smaller-size codes. The codes and the mapping are stored in a structure known as a dictionary.

When used in image compression, a palette, which is one example of a dictionary, is a mapping between distinct image data values (or image values) that are used within the image and shorter encoded values known as palette values. When the number of distinct values to be encoded is small, a palette-based method works well, as both the palette and the palette values replacing the original data are small. The palette can contain mappings for the whole image or only for parts of that image. In the latter case, the palette is known in the art as a local palette or a sub-palette. Palette reordering is a technique known in the art as a method for improving compression. Encoding using the reordered palette tends to yield a better compression ratio.

When storing encoded data, it is desirable that its binary (or other) representation is as small as possible and one way to achieve that is by writing each encoded value with the smallest possible number of bits. The problem with such an approach is that during decoding it might be difficult to recognise where one encoded value ends and another one begins. Hence, very often palette values of fixed length, which is determined by the overall size of the palette, are used to encode the data. When variable length codes are used, one way of solving ambiguity during decoding is to ensure that no one code is a prefix of another. Huffman codes are an example of such encoding.

Other schemes vary the length of encoded values in the bit-stream by inserting length information in the compressed bitstream to guide decompression. U.S. Pat. No. 6,225,922 B1 uses variable length encoding with length flags followed by the actual length indicating that the encoded data values from that point onwards should be read with that length. U.S. Pat. No. 5,825,830 A provides rules for automatically either increasing or decreasing the binary field length for encoding the next data value based on the current field length and the encoded data value. While more sophisticated in the way the length of the current value is determined and partially automated in determining the field length, it also inserts length information into the bit stream, an approach which not only increases the length of the final encoding, but also complicates the decompression process.

SUMMARY

It is an object of the present invention to substantially overcome, or at least ameliorate, one or more disadvantages of existing arrangements.

Disclosed are arrangements, referred to as Increasing Length Encoding (ILE) arrangements, which seek to address the above problems by (a) representing each successive image data value using a Palette value whose length (ie number of bits, also referred to as 'bit representation') is greater to or equal to the length used to represent a previous image data value, and (b) by incorporating, into the data stream, information (one example of which is an 'offset' as described below) recording the position in the data stream at which each Palette value length increase occurs.

The methods disclosed herein achieve compressed encoding of distinct image data values by firstly mapping those distinct image data values to shorter values using a palette and then using variable length encoding for each encoded data value to represent it with the smallest possible number of bits. Palette values are encoded either with the same number of bits or with one more bit than the previously encoded palette value depending on the current data value (ie the bit-lengths of successive palette values are non-decreasing in encoding order). The offsets at which bit representation increases are recorded along with the compressed data, but, in the described examples, in a separate portion of the data stream. The bit-length of these offsets is $Log_2 S$, where S is the image size in pixels, and the offsets are used to read compressed data values correctly during decompression. The disclosed approach ensures that all data values are encoded with the minimum possible number of bits and also eliminates the need for explicit length information to be incorporated within the data stream.

Optionally, for special cases where there is either only one distinct image data value for all pixel positions in a tile, or exactly two distinct image data values in a tile, more efficient encoding schemes are used.

According to a first aspect of the present invention, there is provided a method of encoding a plurality of image values, said method comprising, for a current said image value in a predetermined order:

(a) determining a palette value for said current image value;

(b) determining whether a number of distinct palette values up to and including said palette value is greater than a number of palette values that can be encoded using a current bit representation, and if so:

(i) incrementing said current bit representation; and (ii) recording the position of said image value in said predetermined order;

(c) encoding, if said current image value is a new image value, said current image value using a predetermined number of bits.

According to another aspect of the present invention, there is provided a method of encoding, in a specified order, successive image values of an image, said method comprising, for a current said image value the steps of:

(a) determining, if the current image value is not represented in a palette, whether a palette value for the current image value can be represented by the number of bits representing the largest palette value in the palette;

(b) if the step (a) is not TRUE, then the method comprises the steps of:
  (i) incrementing the number of bits representing the largest palette value in the palette; and
  (ii) identifying the position of the current image value in said specified order; and (c) encoding, if the current image value is a new image value, said current image value using a predetermined number of bits.

According to another aspect of the present invention, there is provided an apparatus for encoding a plurality of image values, said apparatus comprising in relation to a current said image value in a predetermined order:

a memory for storing a program; and
a processor for executing the program, said program comprising:
  (a) code for determining a palette value for said current image value;
  (b) code for determining whether a number of distinct palette values up to and including said palette value is greater than a number of palette values that can be encoded using a current bit representation, and if so:
    (i) code for incrementing said current bit representation; and
    (ii) code for recording the position of said image value in said predetermined order;
  (c) code for encoding, if said current image value is a new image value, said current image value using a predetermined number of bits.

According to another aspect of the present invention, there is provided an apparatus for encoding, in a specified order, successive image values of an image, said method comprising, in relation to a current said image value:

a memory for storing a program; and
a processor for executing the program, said program comprising:
  (a) code for determining, if the current image value is not represented in a palette, whether a palette value for the current image value can be represented by the number of bits representing the largest palette value in the palette;
  (b) code for, if the step (a) is not TRUE:
    (i) incrementing the number of bits representing the largest palette value in the palette; and
    (ii) identifying the position of the current image value in said specified order; and
  (c) code for encoding, if the current image value is a new image value, said current image value using a predetermined number of bits.

According to another aspect of the present invention, there is provided a computer program product including a computer readable medium having recorded thereon a computer program for directing a processor to execute a method for encoding a plurality of image values, said program comprising in relation to a current said image value in a predetermined order:
  (a) code for determining a palette value for said current image value;
  (b) code for determining whether a number of distinct palette values up to and including said palette value is greater than a number of palette values that can be encoded using a current bit representation, and code for, if so:
    (i) incrementing said current bit representation; and
    (ii) recording the position of said image value in said predetermined order; and
  (c) code for encoding, if said current image value is a new image value, said current image value using a predetermined number of bits.

According to another aspect of the present invention, there is provided a computer program product including a computer readable medium having recorded thereon a computer program for directing a processor to execute a method for encoding, in a specified order, successive image values of an image, said program comprising, in relation to a current said image data value:
  (a) code for determining, if the current image value is not represented in a palette, whether a palette value for the current image value can be represented by the number of bits representing the largest palette value in the palette;
  (b) code for, if the step (a) is not TRUE:
    (i) incrementing the number of bits representing the largest palette value in the palette; and
    (ii) identifying the position of the current image value in said specified order; and
  (c) code for encoding, if the current image value is a new image value, said current image value using a predetermined number of bits.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

Figure 1A:
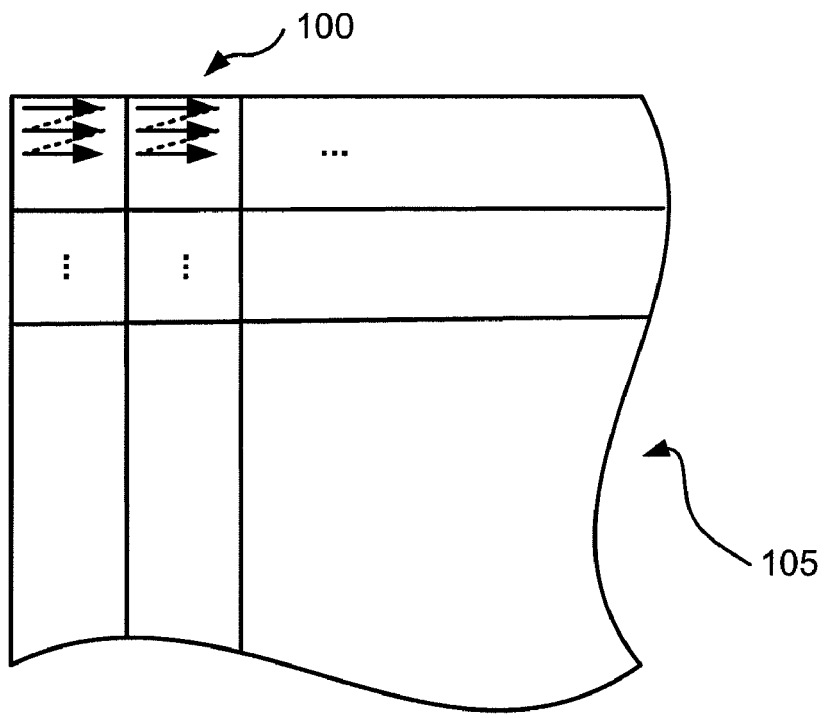
FIG. 1a is an illustration of a page of tiles.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which may form public knowledge through their respective publication and/or use. Such discussions should not be interpreted as a representation by the present inventor(s) or patent applicant(s) that such documents or devices in any way form part of the common general knowledge in the art.

A number of terms and parameters are referred to extensively throughout the rest of the description, and a brief glossary of some of their meanings is as follows:

terms

| | |
|---|---|
| bit representation: | the number of bits used to represent a palette value; |
| block: | a group (typically rectangular in this specification) of pixel positions into which a page can be decomposed for processing; |
| image data values: | a bit representation of a pixel value or other data representing an image; |
| page: | an image; |
| palette: | a dictionary mapping image data values to palette values; |
| palette value: | a mapped binary representation of the corresponding image data value, using fewer bits than the corresponding image data value; |
| run: | a sequence of one or more consecutive identical image data values; |
| tile: | a block | parameters

| | |
|---|---|
| img_value: | an image (data) value; |
| max_num_bits: | the current bit representation; |
| number_of_offsets: | the number of times the value of the parameter offset has changed for the current tile; |
| number_of_values: | the number of runs thus far encountered in the present tile having different image data values; |
| offset: | of a current image data value within a tile identifies the position of the current image data value which is equivalent to the number of pixel positions the current pixel is away from the first pixel in the tile; |
| palette_value: | see term above; |
| pal_max_index: | the current highest palette value; |
| run_len: | the number of successive times an image data value of img_value occurs in the present run; |
| THRESHOLD: | a parameter against which the parameter number_of_offsets is compared to determine which type of encoding to use. |

The principles of the LE arrangements described herein have general applicability to image compression and decompression. For ease of explanation, the ILE arrangements are described with reference to image compression used in a color Raster Image Processing (RIP) system, but it is not intended that the ILE arrangements be limited to the described application. For example, the ILE arrangements may be applied to any arrangement for any data source representable by a palette. The ILE arrangements may be implemented as a software program operating on a general-purpose processing unit or as a sub component of a larger software system. Alternatively, the ILE arrangements may be implemented on special purpose hardware such as on ASIC.

Figure 13:
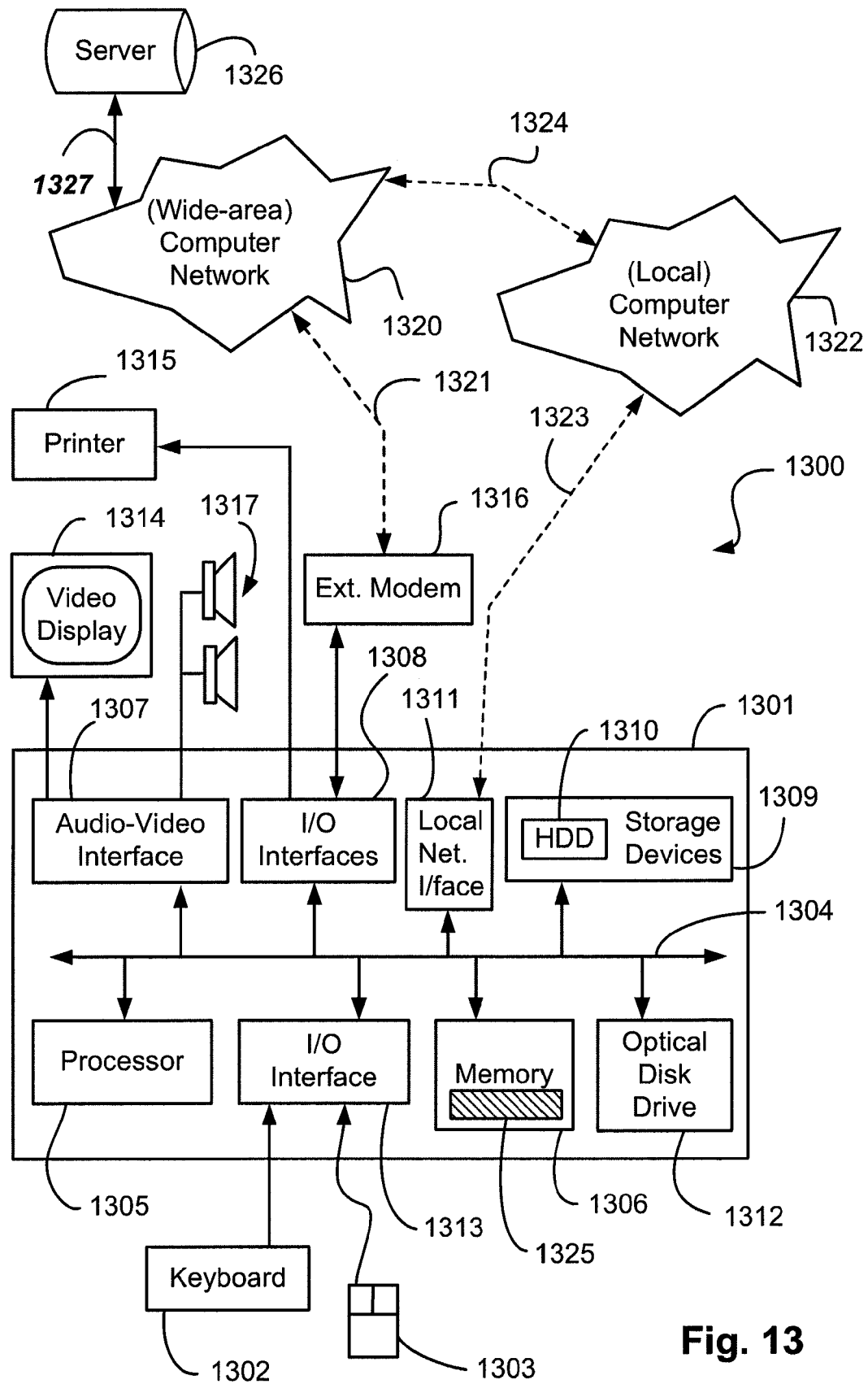
FIG. 13 is a schematic block diagram of a general-purpose computer upon which ILE arrangements described can be practiced.

FIG. 13 is a schematic block diagram of a general purpose computer upon which ILE arrangements described can be practiced. The ILE methods may be implemented using a computer system 1300, such as that shown in FIG. 13 wherein the processes of FIGS. 3-11 may be implemented as software, such as one or more application programs 1325 executable within the computer system 1300. The software is thus tasked with directing a processor 1305 to effect the ILE methods. In particular, the steps of the ILE method can be effected by instructions in the software 1325 that are carried out within the computer system 1300. The instructions may be formed as one or more code modules, each for performing one or more particular tasks. The software may also be divided into two separate parts, in which a first part and the corresponding code modules performs the ILE methods and a second part and the corresponding code modules manage a user interface between the first part and the user.

The ILE software may be stored in a computer readable medium, including the storage devices described below, for example. The software is loaded into the computer system 1300 from the computer readable medium, and then executed by the computer system 1300. A computer readable medium having such software or computer program recorded on it is a computer program product. The use of the computer program product in the computer system 1300 preferably effects an advantageous apparatus for effecting the ILE arrangements.

As seen in FIG. 13, the computer system 1300 is formed by a computer module 1301, input devices such as a keyboard 1302 and a mouse pointer device 1303, and output devices including a printer 1315, a display device 1314 and loudspeakers 1317. An external Modulator-Demodulator (Modem) transceiver device 1316 may be used by the computer module 1301 for communicating to and from an external server 1326 over a communications network 1320 via a connection 1321. The network 1320 may be a wide-area network (WAN), such as the Internet or a private WAN. Where the connection 1321 is a telephone line, the modem 1316 may be a traditional "dial-up" modem. Alternatively, where the connection 1321 is a high capacity (eg: cable) connection, the modem 1316 may be a broadband modem. A wireless modem may also be used for wireless connection to the network 1320.

The computer module 1301 typically includes at least one processor unit 1305, and a memory unit 1306 for example formed from semiconductor random access memory (RAM) and read only memory (ROM). The module 1301 also includes an number of input/output (I/O) interfaces including an audio-video interface 1307 that couples to the video display 1314 and loudspeakers 1317, an I/O interface 1313 for the keyboard 1302 and mouse 1303 and optionally a joystick (not illustrated), and an interface 1308 for the external modem 1316 and printer 1315. In some implementations, the modem 1316 may be incorporated within the computer module 1301, for example within the interface 1308.

The computer module 1301 also has a local network interface 1311 which, via a connection 1323, permits coupling of the computer system 1300 to a local computer network 1322, known as a Local Area Network (LAN). As also illustrated, the local network 1322 may also couple to the wide network 1320 via a connection 1324, which would typically include a so-called "firewall" device or similar functionality. The interface 1311 may be formed by an Ethernet™ circuit card, a wireless Bluetooth™ or an IEEE 802.11 wireless arrangement.

The interfaces 1308 and 1313 may afford both serial and parallel connectivity, the former typically being implemented according to the Universal Serial Bus (USB) standards and having corresponding USB connectors (not illustrated). Storage devices 1309 are provided and typically include a hard disk drive (HDD) 1310. Other devices such as a floppy disk drive and a magnetic tape drive (not illustrated) may also be used. An optical disk drive 1312 is typically provided to act as a non-volatile source of data. Portable memory devices, such optical disks (eg: CD-ROM, DVD), USB-RAM, and floppy disks for example may then be used as appropriate sources of data to the system 1300.

The components 1305, to 1313 of the computer module 1301 typically communicate via an interconnected bus 1304 and in a manner which results in a conventional mode of operation of the computer system 1300 known to those in the relevant art. Examples of computers on which the described arrangements can be practised include IBM-PC's and compatibles, Sun Sparcstations, Apple Mac™ or alike computer systems evolved therefrom.

Typically, the ILE application programs 1325 discussed above are resident on the hard disk drive 1310 and read and controlled in execution by the processor 1305. Intermediate storage of such programs and any data fetched over the networks 1320 and 1322 may be accomplished using the semiconductor memory 1306, possibly in concert with the hard disk drive 1310. In some instances, the application programs 1325 may be supplied to the user encoded on one or more CD-ROM and read via the corresponding drive 1312, or alternatively may be read by the user over the networks 1320 or 1322.

Still further, the software can also be loaded into the computer system 1300 from other computer readable media. Computer readable media refers to any storage or transmission medium that participates in providing instructions and/or data to the computer system 1300 for execution and/or processing. Examples of such storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1301. Examples of computer readable transmission media that may also participate in the provision of instructions and/ or data include radio or infra-red transmission channels as well as a network connection to another computer or networked device, and the Internet or Intranets including e-mail transmissions and information recorded on Websites and the like.

The second part of the ILE application programs and the corresponding code modules mentioned above may be executed to implement one or more graphical user interfaces (GUIs) to be rendered or otherwise represented upon the display 1314. Through manipulation of the keyboard 1302 and the mouse 1303, a user of the computer system 1300 and the application may manipulate the interface to provide controlling commands and/or input to the ILE applications associated with the GUI(s).

The ILE methods may alternatively be implemented in dedicated hardware such as one or more integrated circuits performing the functions or sub functions of the ILE arrangements. Such dedicated hardware may include graphic processors, digital signal processors, or one or more microprocessors and associated memories.

Figure 1B:
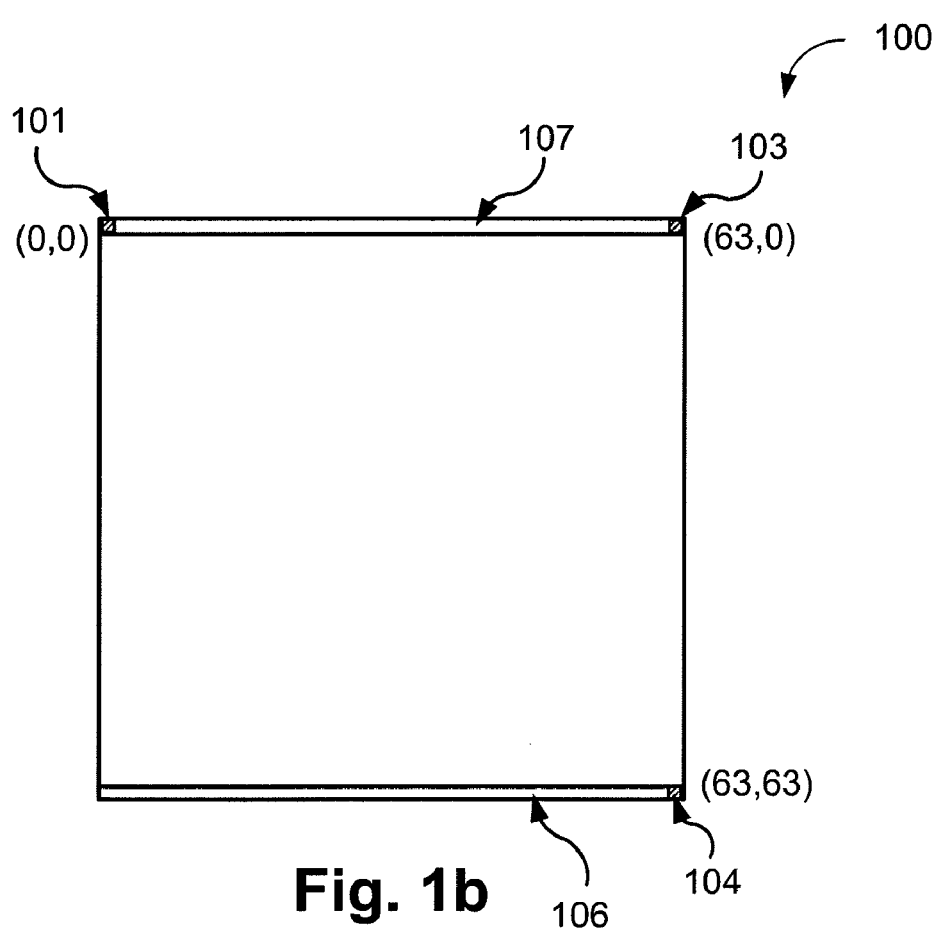
FIG. 1b is an illustration of a tile.

The ILE methods may be used to compress image data resulting from rendering a page description by a RIP. Referring to FIG. 1*a*, a rendered page will be described. For the purposes of this disclosure a page 105 consists of blocks, e.g. 100, of pixels wherein there are multiple blocks across the width of the page 105 and multiple blocks down the length of the page 105. These blocks such as 100, each consisting of N by M pixels, are called tiles. Tiles are preferably disjoint and collectively cover the page. Referring to FIG. 1*b* the tile 100 will be described in more detail. For example for an A4 page using a printer resolution of 600 dpi, a suitable choice for tile dimensions is M=N=64. The position of a pixel, (X, Y) where X, Y are integers, within a tile is relative to the upper left hand corner of the tile. Y indexes the tile rows whereas X indexes the offset of a pixel along a tile row. A tile row consists of the set of pixels that span the width of the tile. For example the first pixel 101 in the first tile row 107 of the tile 100 occupies pixel position (0, 0) having a reference numeral 101, whereas the last pixel 103 in the first tile row 107 of the tile 100 occupies pixel position (63, 0) having a reference numeral 103.

Accordingly, the last pixel 104 in the last tile row 106 of the tile 100 occupies position (63, 63) having a reference numeral 104. Raster tile order refers to processing a tile, pixel by pixel, tile row by tile row, in a predetermined specified (sequential) order, starting with the first tile row and ending with the last row, as illustrated within the tile 100 in FIG. 1*a*. Image data values refer to pixel colours or other data representing an image. Where the dimensions of a page do not contain an integer number of tiles, the page is preferably padded to the required size. Typically, tiles are processed one by one, though they may also be processed in parallel.

The offset of a pixel within a tile is the number of pixel positions it is away from the first pixel (eg 101 is the first pixel in the tile 100 in FIG. 1*b*). If the pixel's position is (X,Y), then its offset is Y*M+X, where M is the number of pixels in a single row.

Each pixel position as described above has one or more image data values associated with it such as the pixel's colour, whether the pixel belongs to the background or foreground of the image, references to other data and other image information. The ILE arrangements can be applied to all kinds of image data, and yield their greatest advantage on image data which can be efficiently represented with a palette.

Bit representation refers to the number of bits used to represent an encoded image data value in memory. The ILE arrangements vary that bit representation throughout the encoding by increasing it to accommodate the number of distinct values mapped so far. Detailed description of some ILE arrangements follows.

Figure 2:
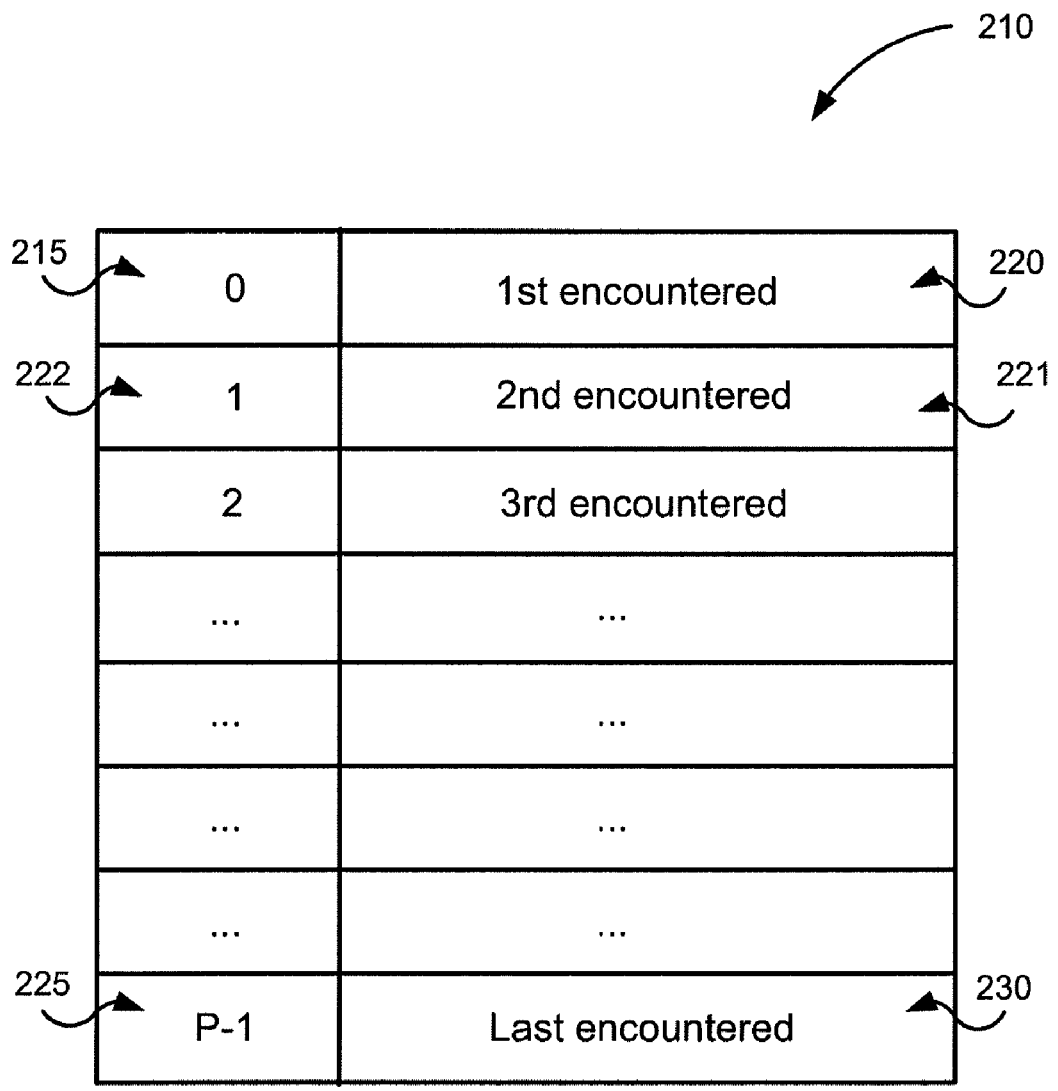
FIG. 2 depicts a palette data structure.

FIG. 2 illustrates a Palette 210 for a given tile which stores mappings between original image data values (the right column) and shorter encodings called palette values (the left column). The palette 210 contains an entry for each distinct image data value within a given tile in the order encountered as the tile is processed in raster order. The first distinct encountered image data value 220 in the tile is mapped onto a palette value 215, while the last distinct encountered image data value 230 encountered in the raster scan is mapped onto a palette value 225 which is (currently) the largest palette value in the palette 210.

Figure 3:
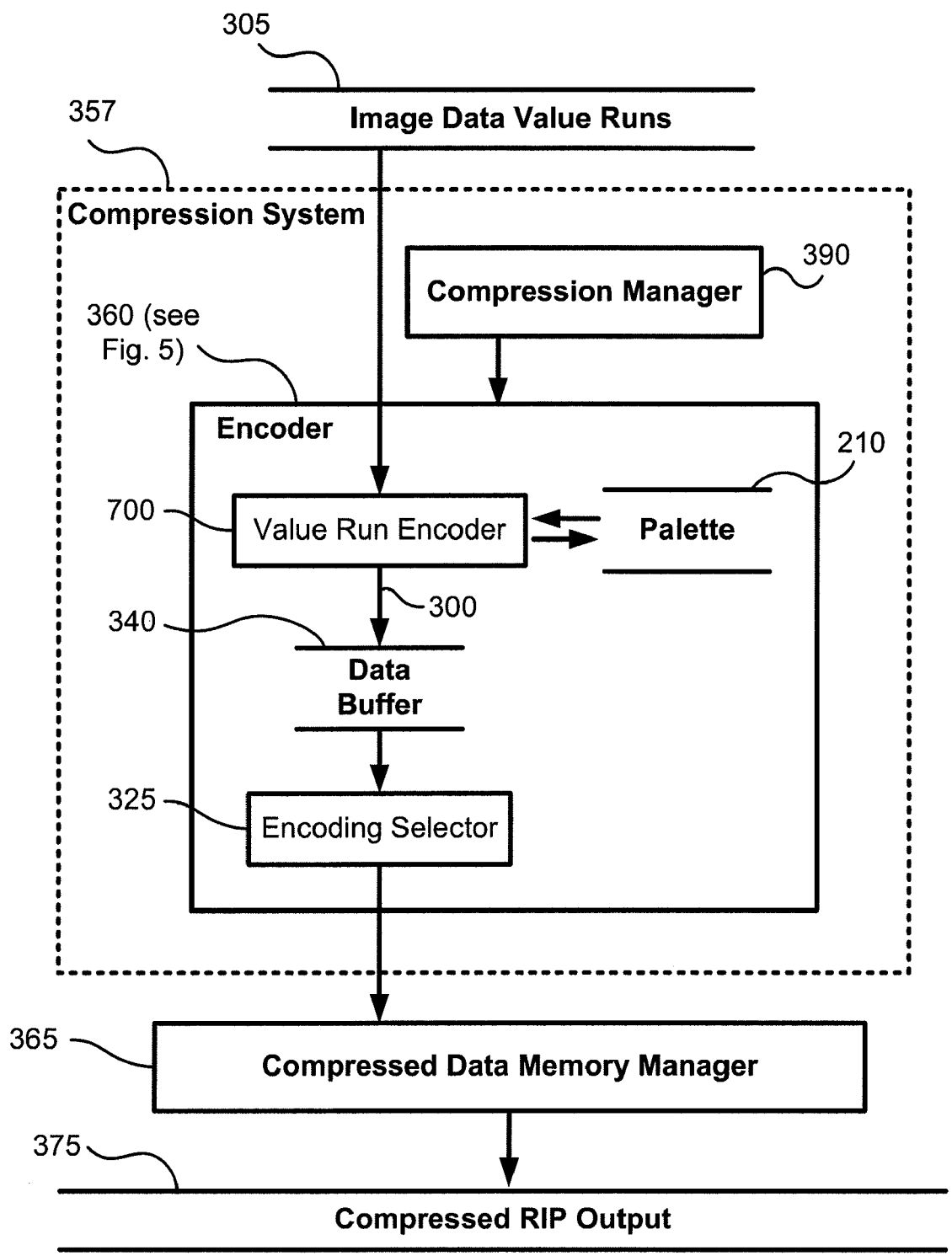
FIG. 3 is a data flow diagram showing an image data compressor within which the ILE arrangements may be practiced.

FIG. 3 is a data flow diagram illustrating a Compression System 357 having an Encoder 360 within which the LE compression arrangements may be practised. The compression system 357 can be implemented as part of the ILE software application 1325 in FIG. 13. When a tile such as 100 in FIG. 1*a* (which may for example be extracted by the processor 1305 from an image that has communicated to the computer module 1301 from the server 1326 over the network 1320 and stored in the memory 1306) is processed in raster order, for example by the processor 1305 executing a RIP according to instructions in the LE software 1325, the process produces "Image Data Value Runs" 305 where a "run" is a sequence of consecutive identical image data values. Data from the Image Data Value Runs 305 within a tile is passed to a Value Run Encoder 700 when a Compression Manager 390 notifies the Encoder 360 to compress the image data. A palette 210 is generated by the Value Run Encoder 700 during encoding of the tile and the palette 210 is stored, in the memory 1306 for example, for use during execution of the ILE method. The encoded data 300 is written to a Data Buffer 340, which is used as temporary storage until an Encoding Selector 325 chooses the encoding scheme that is most efficient for the image data in the tile. The encoded data in the Data Buffer 340 is written to a Compressed RIP Output 375 by a Compressed Data Memory Manager 365. The compressed RIP output 375 may be stored in the hard disk drive 1310 for use at a later time. There are, in the disclosed ILE arrangements, three encoding schemes for tile data from which the Encoding Selector 325 may choose, these schemes being referred to herein as Case 1, Case 2, and Case 3.

In an alternative arrangement of ILE compression, the image data to be encoded is read from a buffer in a predetermined encoding order, which may be raster order or some other order, before being passed to the compression system 357. The predetermined encoding order must be known to the decompression system. The disclosed LE compression arrangements are most efficient if the predetermined encoding order matches the order in which the rate of appearance of new image values is initially lowest.

Figure 4:
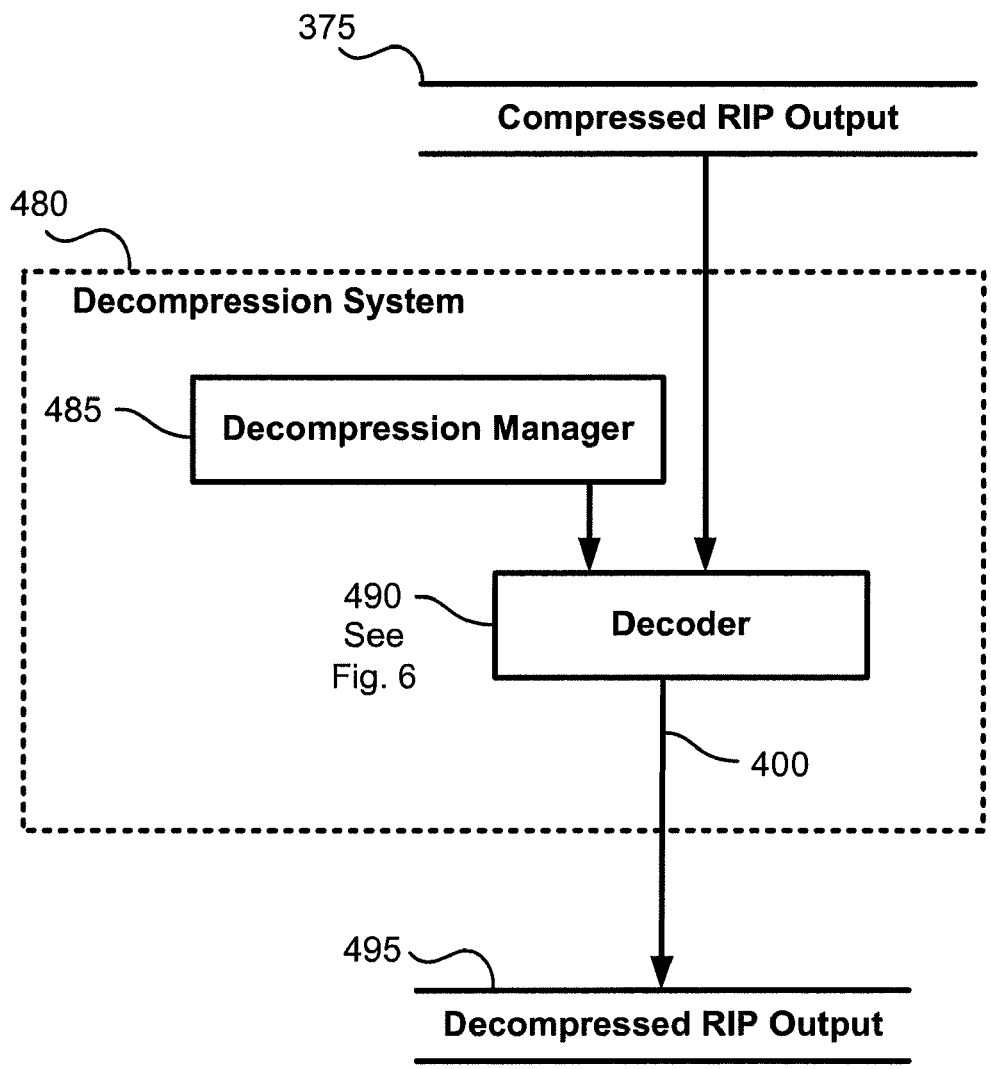
FIG. 4 is a data flow diagram showing an image data decompressor complementing the compressor of FIG. 3.

FIG. 4 is a data flow diagram illustrating a Decompression System 480, that can be implemented as part of the ILE software application 1325, having a Decoder 490 within which the ILE decompression arrangements may be practised. Decompression is guided by a Decompression Manager 485. Data is passed from the Compressed RIP Output 375, that as noted above may be stored in the hard disk drive 1310, for example, to the Decoder 490 and the decompressed image data 400 is written into a Decompressed RIP Output 495. The Decompressed RIP output 495 may be stored in the hard disk drive 1310 for use at a later time, or may be communicated to the external server 1326 over the network 1320.

Figure 5:
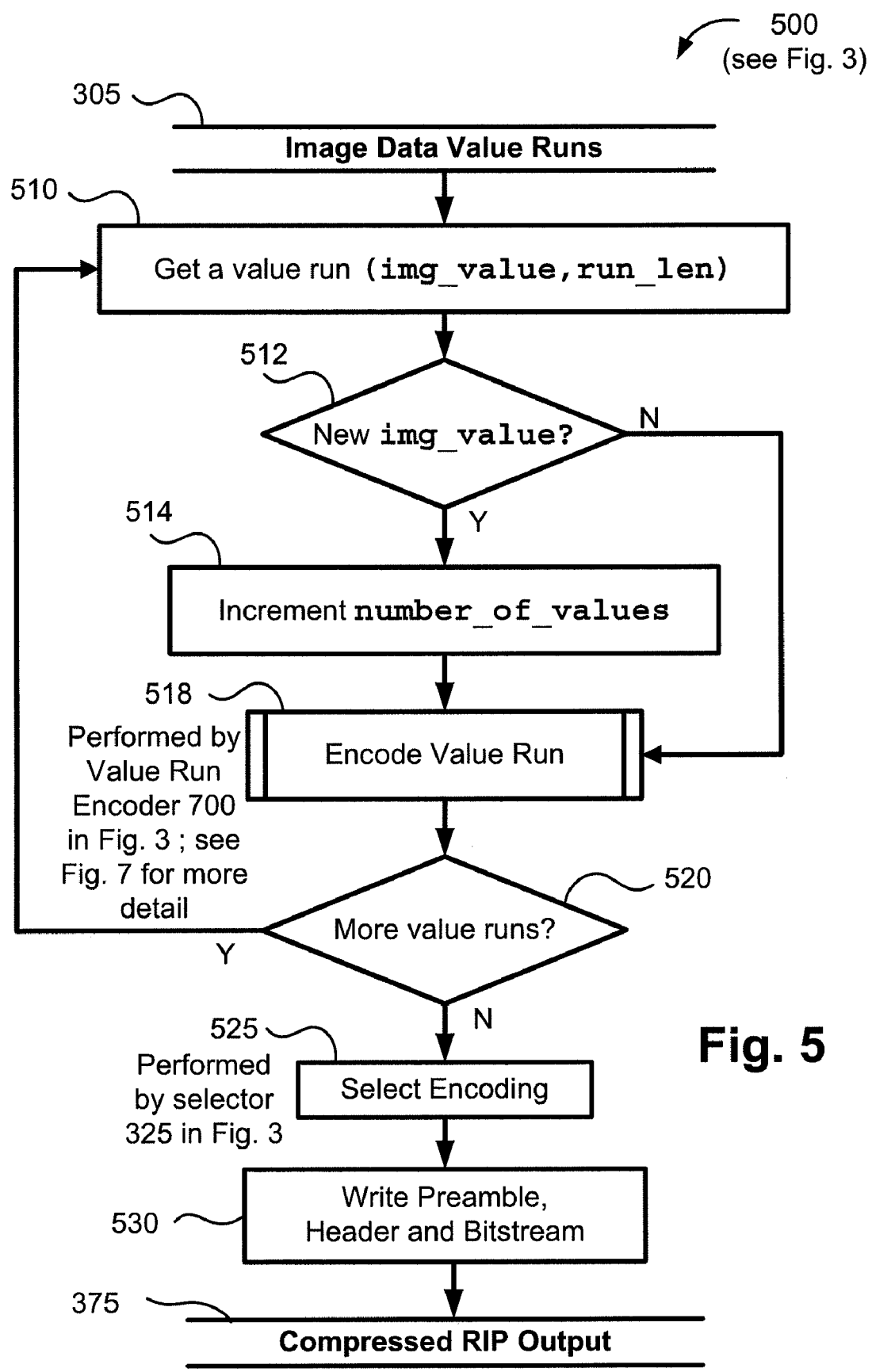
FIG. 5 is a flow diagram for an image data compression process according to one ILE arrangement.
Figure 7:
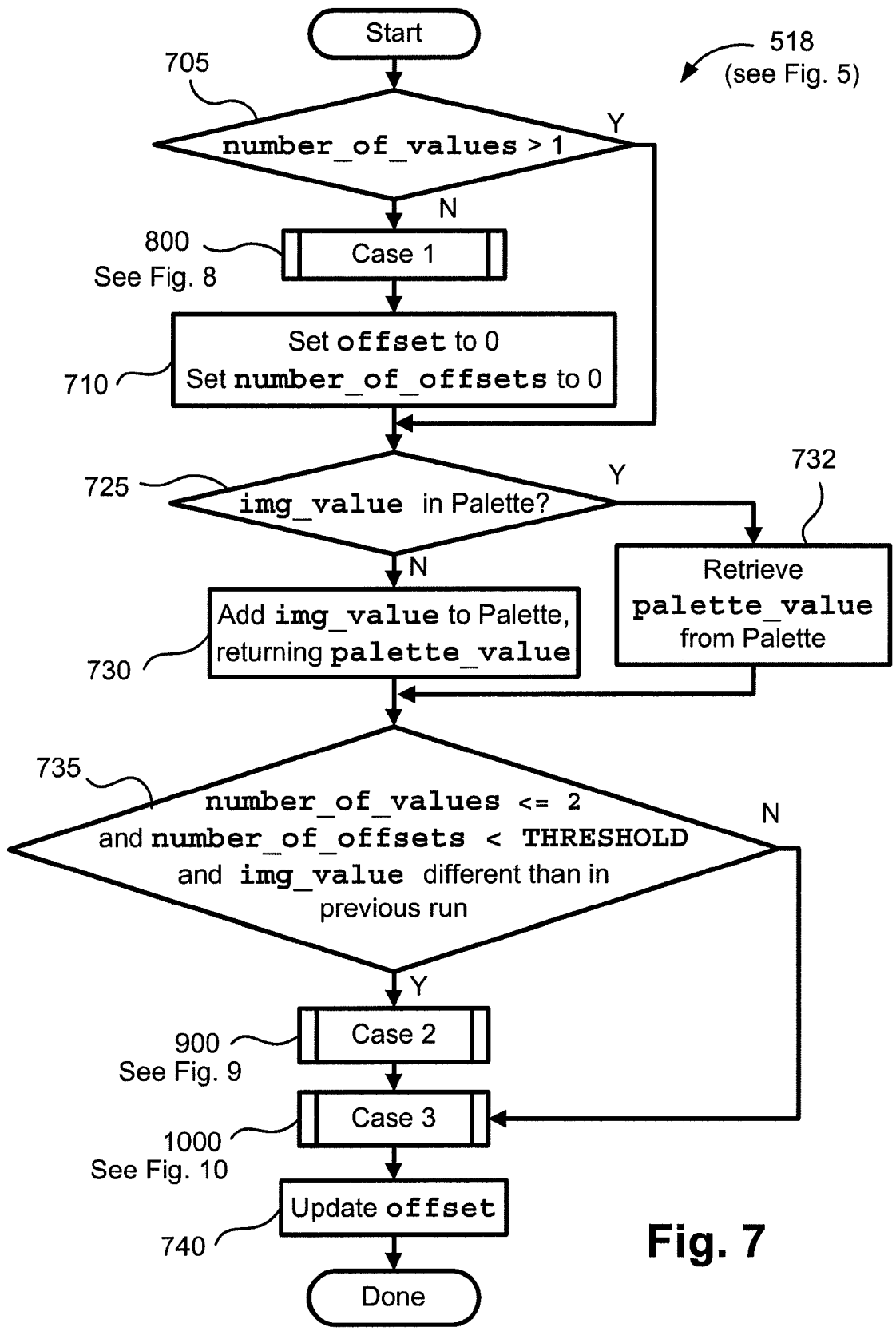
FIG. 7 is a flow diagram for the processing of a value run in the compression process of FIG. 5.

FIG. 5 is a flow diagram illustrating a compression process 500 carried out by the Encoder 360 (see FIG. 3) for image data values from the Image Data Value Runs 305 (see FIG. 3) for a given tile. In a step 510 data representing a run from Image Data Value Runs 305 is preferably supplied, by the processor 1305 from data stored in the memory 1306, for example, as a tuple, (img_value, run_len) where the parameter img_value is an image data value, and the parameter run_len is the image data value run length. Alternatively the data from Image Data Value Runs 305 may be the run of image values itself. If the parameter img_value is new for the tile in question, a check performed in a step 512 by the processor 1305 under the control of the ILE software 1325, a parameter number_of_values is incremented in a step 514. Otherwise, the step 514 is skipped. Either way, a subsequent sub-process 518 that is carried out by the Value Run Encoder 700 (see FIG. 3) encodes the given value run, storing the result in the Data Buffer 340 (see FIG. 3). FIG. 7 depicts the sub-process 518 carried out by the Value Run Encoder 700 in detail.

A following step 520, performed by the processor 1305 under the control of the ILE software 1325, determines if there are more value runs remaining to be encoded for the present tile. If there are more value runs to be encoded then the process 500 returns to the step 510. If there are no more value runs to be encoded then the process 500 proceeds to a step 525 that is carried out by the module Encoding Selector 325 (see FIG. 3). The Encoding Selector 325 chooses the most efficient encoding scheme for the image data values in the current tile (the encoding options, for the present arrangements, being Case 1, Case 2 or Case 3). Next, in a step 530, performed by the processor 1305 under the control of the ILE software 1325, a Preamble specifying the encoding scheme selected in the step 525, a Header, which contains decoder-guiding information, and the encoded bitstream are written to the Compressed RIP Output 375 as described in detail below.

The Subprocess 518 in FIG. 5, that is carried out by the Value Run Encoder 700 in FIG. 3 will now be described with reference to FIG. 7. A Decision step 705 determines whether the parameter number_of_values is greater than 1. If the parameter number_of_values is less than or equal to one then the data is encoded using a sub-process 800 (this relating to Case 1). If the parameter number_of_values is greater than 1, the Value Run Encoder 700 proceeds to a step 725. Following the sub-process 800, a step 710 sets the initial value of a parameter offset to 0 and a parameter number_of_offsets to 0, these being initialisations that are required for Cases 2 and 3. The Decision step 725 checks whether the parameter img_value is already in the Palette 210 (see FIG. 3). If the parameter img_value has previously been added to the Palette 210, then the Value Run Encoder 700 proceeds to a decision step 735. If the parameter img_value has not been previously added to the Palette 210, then the parameter img_value is added to the Palette 210 in a step 730, thus returning a variable palette_value starting at 0 and increasing each time a new image value is added to the Palette 210. If the parameter img_value has been previously added to the Palette 210, the corresponding parameter palette_value is retrieved from the palette in a step 732.

A following step 735 checks three conditions in order to determine whether data is to be encoded using a process 900 (Case 2). The three conditions checked in the decision step 735 are described below.

The first condition is whether the number of distinct image data values thus far encountered for the present tile is less than or equal to 2, as Case 2 encodes only bi-value tiles.

The second condition concerns the efficiency of Case 2 encoding over Case 3 encoding, and this second condition, (number_of_offsets<THRESHOLD, defined below), has to be true for Case 2 to be used.

Furthermore, the process 900 only has to be performed for a value run with different img_value from the previous run, and this is the third condition. Two consecutive value runs having the same image data value can occur on scanline boundaries (the same image data value can occur at the end of one scanline and the beginning of the next scanline) and these occurrences are represented as two separate and consecutive value runs. Such value runs are treated as one value run when applying Case 2, so a separate processing is not performed for the latter run, but the previous run's length is increased by the length of the current run (ie the variable offset is updated accordingly in a step 740). The updating of the parameter offset serves the function of identifying the position of the image data value in question. This last condition is not checked for the very first run in a tile, as there is not a previous value run with which to compare its image data value. When all these three conditions hold, the sub-process 900 is performed, and if one or more of these conditions are false, the sub-process 900 is skipped and execution proceeds to a sub-process 1000 (Case 3).

The last step in the sub-process 518 is a step 740, which updates the value of the parameter offset to contain the next position to be processed within the tile as an offset from the beginning of the tile to the end of the current run.

The three possible encoding schemes are now described in turn. The first two schemes, Case 1 and Case 2, use data profiling to enable more efficient encoding. Case 3 is the general case and can be used for any possible data patterns.

Figure 12:
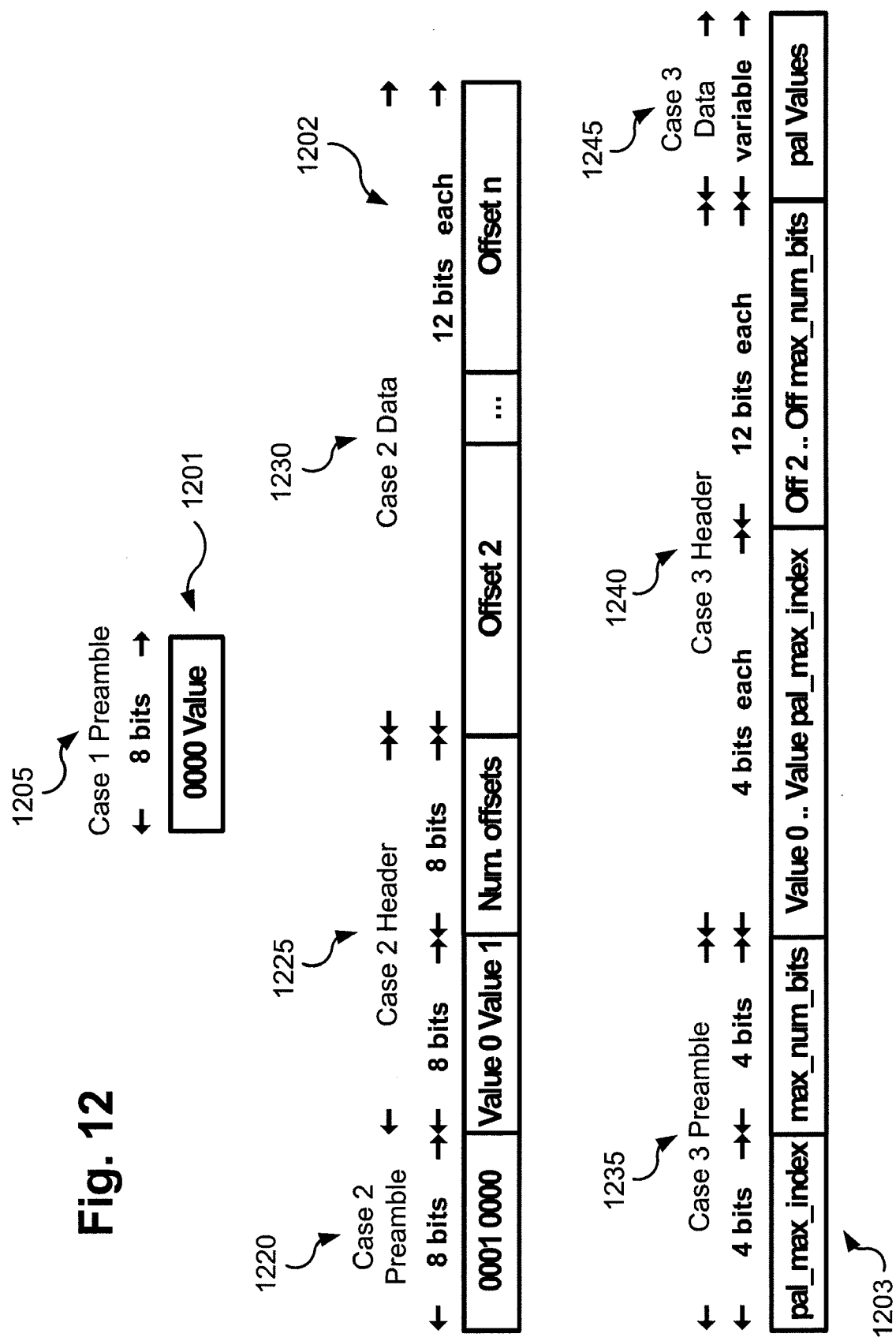
FIG. 12 is illustrates exemplary results of the encoding schemes Case 1, Case 2, and Case 3 with field sizes given for 4-bit image data values and a tile of 64 by 64 pixels.

FIG. 12 illustrates buffer segments forming part of the Data Buffer 340 (see FIG. 3) used to hold intermediate data for Case 1 (see reference numeral 1202), Case 2 (see reference numeral 1202) and Case 3 (see reference numeral 1203), throughout the compression process 500 as intermediate data structures, until one of these encoding schemes is chosen for the current tile at the step 525 in FIG. 5.

The number of bits depicted for each field in FIG. 12 is typical for the situation in which original image data values are represented by 4 bits, and a tile has dimensions of 64 by 64 pixels. Case 1 (ie 1201) encoding data consists of 1 byte only, this being for a Case 1 Preamble 1205 which contains the binary string '0000' followed by the image data value for all pixel positions in the tile. A Preamble 1220 for Case 2 (ie 1202) has a fixed binary string value of '00010000'. A Case 3 Preamble 1235 tells the Decoder 490 (see FIG. 4) that Case 3 encoding has been used, while supplying the maximum palette value used and the maximum number of bits used at the same time (4 bits each). A Case 2 Header (ie 1225) is 16 bits long and contains the two 4-bit image data values in the tile followed by the number of offsets (represented using 8 bits). The Case 2 Data (ie 1230) contains the offsets themselves written as 12-bit values. A Case 3 Header (ie 1240) contains the palette values (represented by 4 bits each) followed by the tile offsets at which bit representation changes (12 bits each). The Case 3 Data (ie 1245) contains the encoded data written using a variable number of bits.

Figure 8:
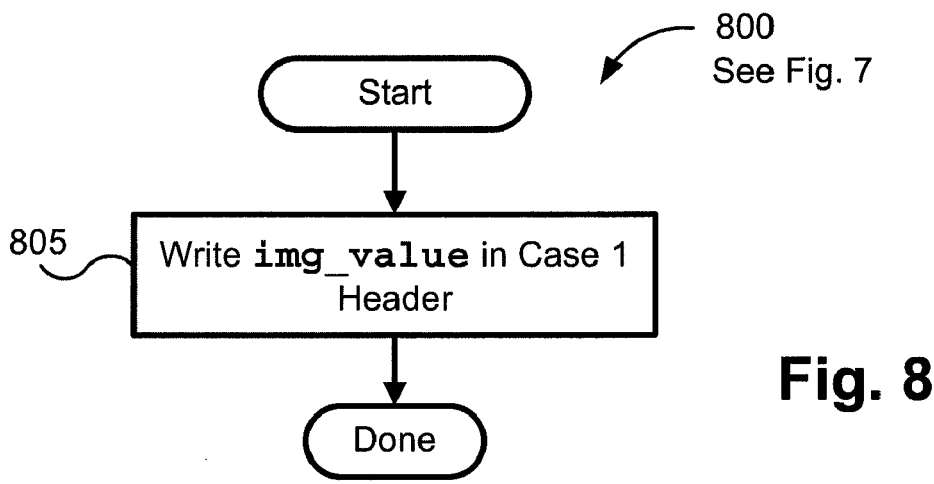
FIG. 8 is a flow diagram for the encoding of a value run using Case 1 of FIG. 7.

Case 1, implemented by the sub-process 800 described with reference to FIG. 8, is the simplest of the three encodings and is used for tiles where all pixel positions have the same image data value associated with them. A step 805 of the process 800 writes the parameter img_value in the Case 1 Preamble 1205.

Figure 9:
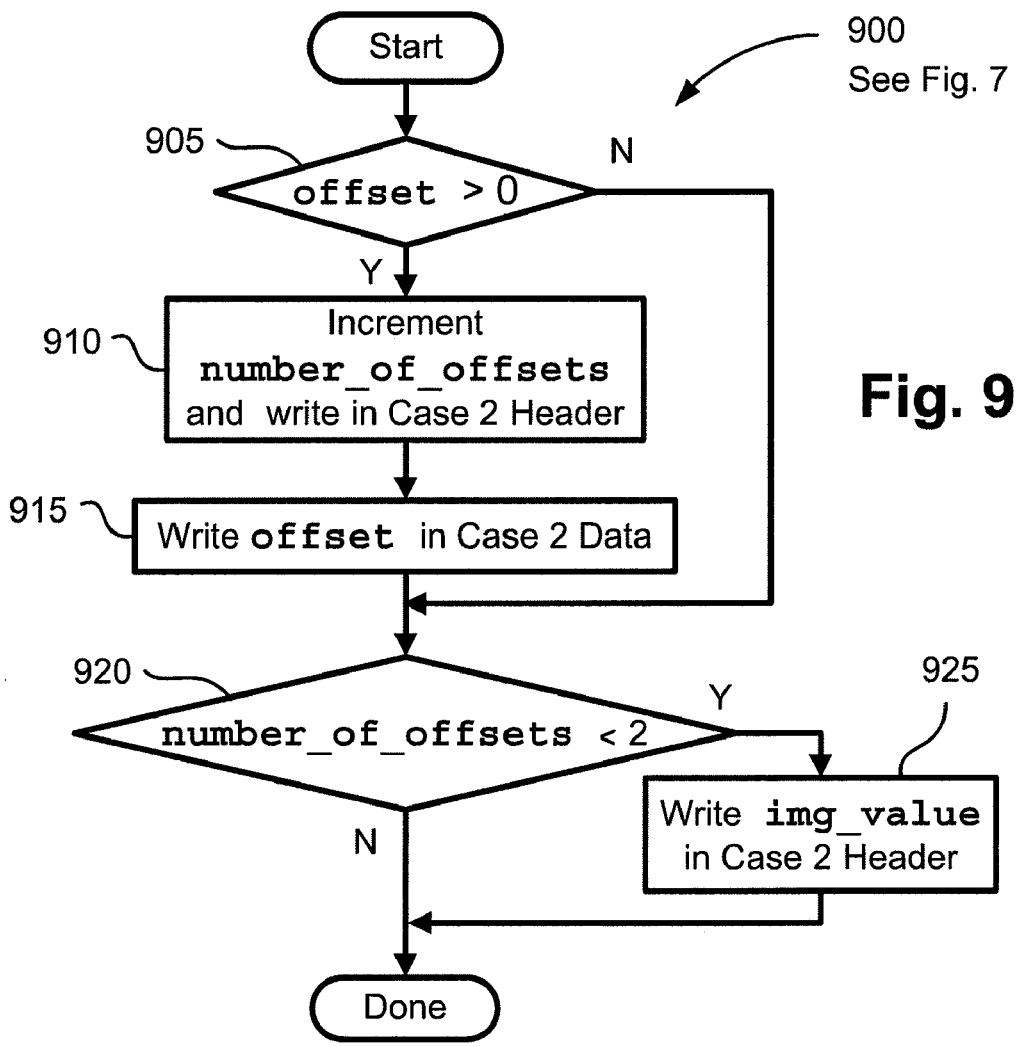
FIG. 9 is a flow diagram for the encoding of a value run using Case 2 of FIG. 7.

Case 2, implemented by a sub-process 900 described with reference to FIG. 9, is used when there are exactly two image data values in a tile, alternating less than a number of times specified by a parameter called THRESHOLD, preferably defined by the equation:

$$\text{THRESHOLD} = \frac{2^{(PowerWidthOfTile + PowerHeightOfTile)}}{PowerWidthOfTile + PowerHeightOfTile} - 1 \quad [1]$$

where: PowerWidthOfTile is the number of bits needed to represent the width of a tile, PowerHeightOfTile is the number of bits needed to represent the height of a tile. For a tile of 64 by 64 pixels, these powers PowerWidthOfTile and PowerHeightOfTile are both 6, and accordingly THRESHOLD is equal to 340.

A step 905 checks if the condition offset>0 is true. When that is the case, a following step 910 increments the value of the parameter number_of_offsets and writes that value in the Case 2 Header 1225, and a next step 915 writes the value of the parameter offset in the Case 2 Data 1230. Initially, the variable offset is 0, and so both steps 910 and 915 are skipped for the first value run in a tile.

Next, a step 920 checks if the parameter number_of_offsets is less than 2. When the number of offsets is less than 2, a new image data value is recorded in the Case 2 Header 1225 in a step 925. When the number of offsets is greater than 2, the step 925 is skipped as both image data values for that tile have already been written to the Case 2 Header 1225 while processing previous value runs.

Figure 10:
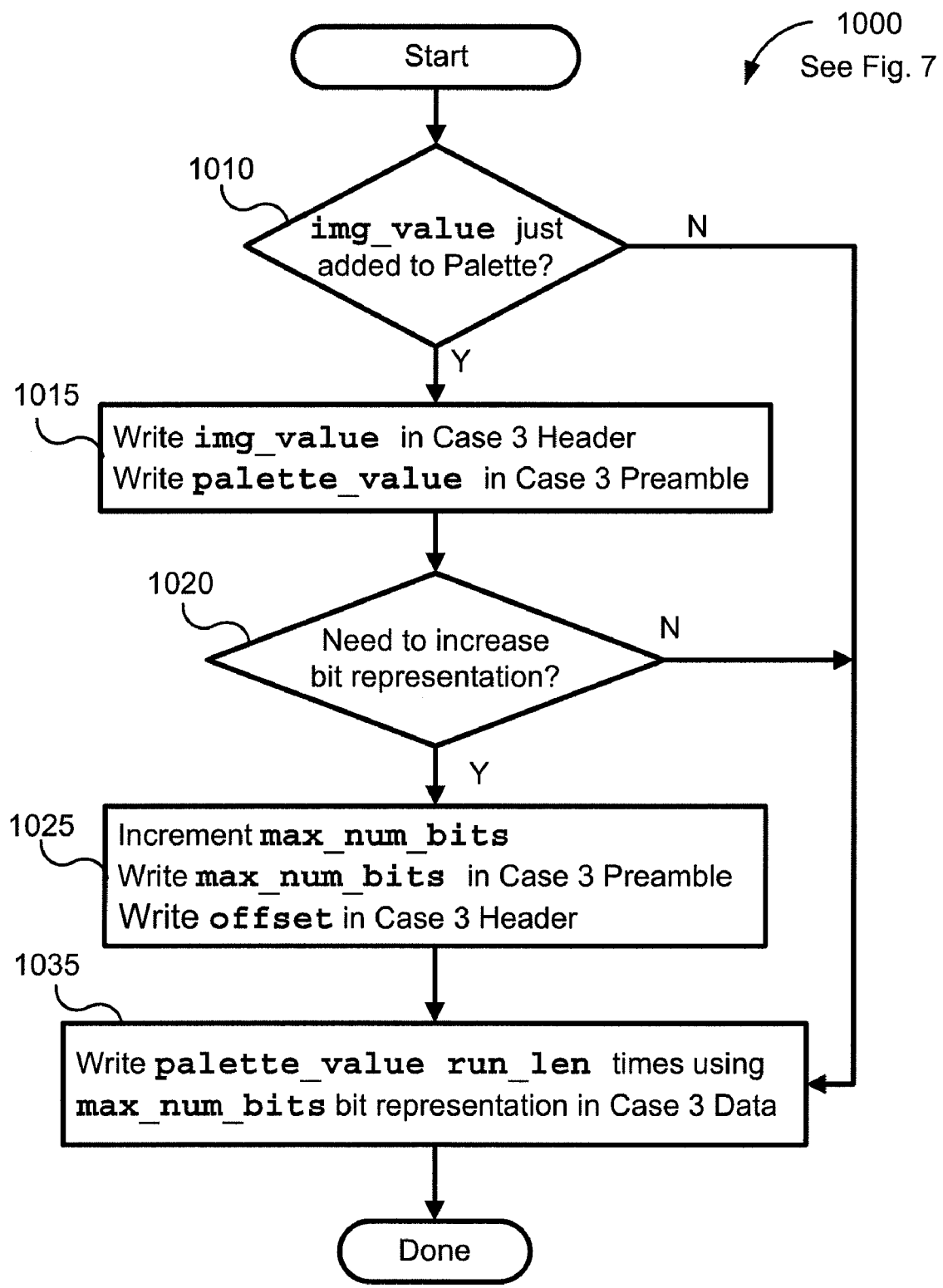
FIG. 10 is a flow diagram for the encoding of a value run using Case 3 of FIG. 7.
Figure 11:
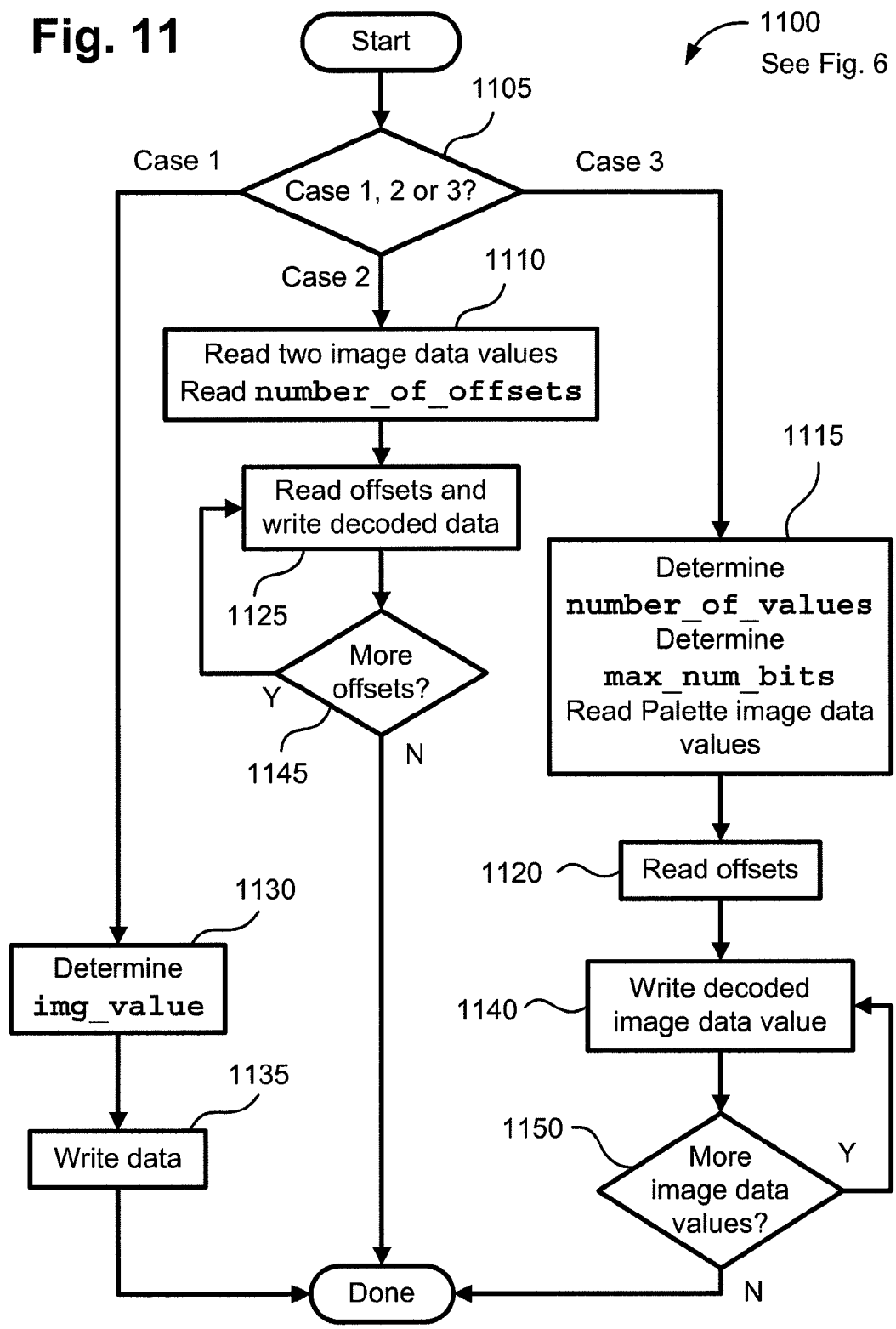
FIG. 11 is a flow diagram for the decoding of the bitstream in the decompression process of FIG. 6.

Sub-process 1000 (Case 3), now described with reference to FIG. 10, starts with a check in a step 1010 of whether the image value has just been added to the Palette 210 (see FIG. 3) in the step 730 in FIG. 7. If this is true, a step 1015 writes that new img_value parameter value to the Case 3 Header 1240. The step 1015 also writes the parameter palette_value for the parameter img_value as the parameter pal_max_index in the first nibble of the Case 3 Preamble 1235. Returning to the step 1010, if the current image value has been added to the Palette 210 while processing a previous value run with the same image data value, a next step 1035 writes encoded data in the Case 3 Data 1245 as described below.

The variable max_num_bits holds the current bit representation and the parameter max_num_bits is initially set to 1. Each palette value in Case 3 is written to the Case 3 Data 1245 with a number of bits equal to the current value of max_num_bits. The Value Run Encoder 700 uses one bit when there are up to two values in the palette 210, two bits for when there are up to four data values, three bits when there are up to eight data values, etc. A Decision step 1020 checks if the bit representation represented by the parameter max_num_bits needs to be increased. If the parameter max_num_bits needs to be increased in relation to its preceding value, a step 1025 increments the parameter max_num_bits and updates its value in the Case 3 Preamble 1235. The step 1025 also records the current value of the parameter offset in the Case 3 Header 1240 as an offset where bit representation increases. Optionally, max_num_bits is checked against an upper limit, and if the limit is exceeded encoding halts and a 'fail' message is returned, indicating the image data should be encoded using some other encoding scheme.

When the current bit representation does not need to be increased as it is big enough to encode the parameter palette_value for the parameter img_value from the current value run, the step 1025 is skipped and processing continues with a step 1035 which writes the parameter palette_value for the parameter img_value of the current value run run_len times in the Case 3 Data 1240 using the number of bits specified by the parameter max_num_bits. During any execution of the step 1035, the current parameter palette_value is encoded using a number of bits specified by the parameter max_num_bits regardless of its prior bit representation in the bitstream, if any.

After the sub-process 518 (see FIG. 5) is completed, a check is made in the decision step 520 as to whether there are more value runs to encode. When that is the case, the steps 510, 512, 514 and 518 are repeated. When there are no more value runs to encode, the step 530 writes the encoded data for exactly one case from cases 1, 2 and 3 according to the encoding scheme selected in the step 525. The respective Preamble, Header and Data for the selected encoding scheme are written into the Compressed RIP Output 375.

Figure 6:
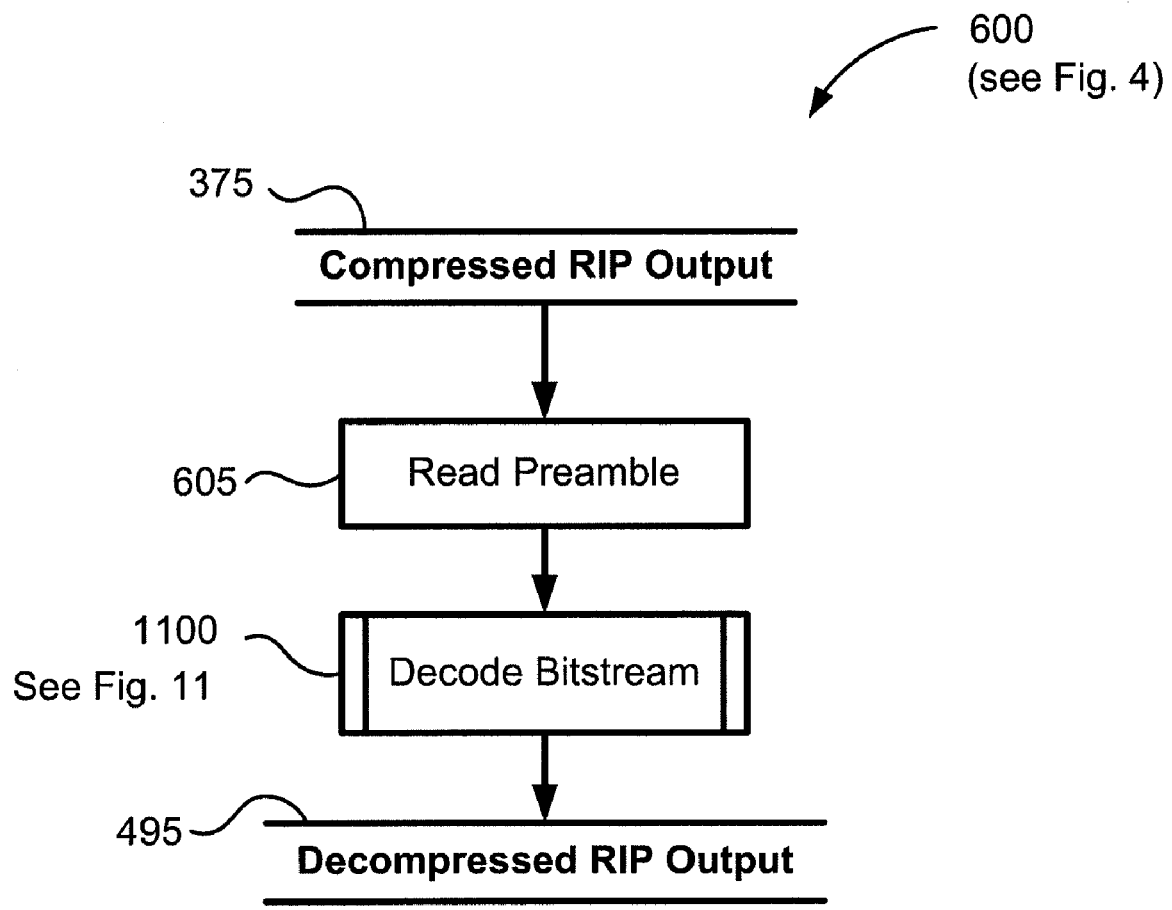
FIG. 6 is a flow diagram for an image data decompression process complementing the image compression process of FIG. 5.

Decompression is performed by the Decoder 490 (see FIG. 4) according to a process 600, now described with reference to FIG. 6. A step 605 reads the Preamble from the Compressed RIP Output buffer 375. A sub-process 1100 decodes the bitstream and writes it into the Decompressed RIP Output buffer 495. The Decoding sub-process 1100 will now be described in more detail with reference to FIG. 11.

Decoding is performed according to one of the Cases 1, 2 or 3. The case number specified in the Preamble that is read in the step 605 (see FIG. 6) is determined in a decision step 1105. If Case 1 has been used for encoding, a step 1130 determines the parameter img_value using the second nibble in the Preamble 1205. A following step 1135 writes the parameter img_value for each pixel position in the tile to the Decompressed RIP Output 495, whereupon step 1100 concludes.

If Case 2 has been used for encoding, a step 1110 reads the two image data values in the palette and the parameter number_of_offsets from the Case 2 Header 1225. A following step 1125 uses the parameter number_of_offsets and the offsets read from the Case 2 Data 1230 to write decoded image data values to the Decompression RIP Output 495, until there are no more offsets, a condition checked in a step 1145 by comparing a counter to the parameter number_of_offsets. The two image data values read in the step 1110 alternate at the recorded offsets within the tile. Step 1100 then concludes.

If Case 3 has been used for encoding, a step 1115 determines the parameter number_of_values as the first nibble (pal_max_index) of the Preamble 1235 incremented by 1. The step 1115 also places the second nibble in the Preamble 1235 into the variable max_num_bits. For space efficiency, the parameter max_num_bits may not be recorded in the Case 3 Preamble 1235, in which event it is instead inferred from the parameter pal_max_index. The value of the parameter pal_max_index plus 1 is in fact the biggest palette value. The log to base two of that biggest palette value, rounded up to the nearest integer, can be used to compute the parameter max_num_bits. In the example in FIG. 12, the Preamble in each case is one byte. In Case 3 1203 there is room in the Case 3 Preamble 1235 to record the parameter max_num_bits, so there is no need to compute that value from the parameter pal_max_index. The step 1115 also reads the palette image data values from the Case 3 Header 1240, and constructs the Palette 210. The position of each image data value in the Case 3 Header 1240 implies its corresponding parameter palette_value with palette values starting from 0.

A following step 1120 reads the offsets at which bit representation changes from the Case 3 Header 1240. The number of offsets to read is max_num_bits −1. A subsequent step 1140 reads the palette values from the Case 3 Data 1245 using variable bit representation until there is no more data, a check performed in a step 1150. The bit representation increases at each recorded offset to eventually reach the value of the parameter max_num_bits at the last recorded offset. The image data values corresponding to each palette value are written to the Decompressed RIP Output 495 in the step 1140.

The following example is used to illustrate the compression and decompression of a tile having the following sequence of value runs at the beginning of its data stream: (5, 20) (6, 4) (5, 40) (5, 10) (4, 20) (6, 10) . . . .

The parameter THRESHOLD is 340 since M (tile width)= N (tile height)=64.

The first value run is the image data value 5 repeated 20 times. This run is processed for all cases in sub-processes 800, 900 and 1000 of FIG. 7. Since the parameter number_of_values is set to 1 in the step 514 (see FIG. 5), in the step 805 of the process 800 (see FIG. 8) the value 5 is written in the Case 1 Preamble 1205 using 4 bits. The image data value 5 is not found in the Palette 210, so the step 730 (see FIG. 7) adds 5 to the Palette 210 returning a value of the parameter palette_value of 0. The condition in the step 735 is true, so the process 900 is executed. The parameter offset is 0 and the parameter number_of_offsets is 0, so only the step 925 (see FIG. 9) which writes the value 5 using 4 bits in the Case 2 Header 1225 as Value 1 is performed for that value run.

The process 1000 (see FIG. 10) for Case 3 starts by checking if 5 has just been added to the Palette 210 in the step 730. As that is the case, the step 1015 is executed, where 5 is written to the Case 3 Header 1240 as Value 0 using 4 bits, and the parameter pal_max_index, being the latest assigned palette value of 0, is written in the first nibble of the Case 3 Preamble 1235 using 4 bits. Bit representation does not have to be increased (as determined by the decision step 1020) since 1 bit is sufficient to encode the palette value of 0. The step 1035 writes 5's palette value 0 twenty times in the Case 3 Data 1245 using 1 bit each time, i.e. as the binary string '0' for each data value. The parameter offset is updated to 20 in the step 740.

The next value run fetched in the step 510 (see FIG. 5), is (6, 4), and since the parameter number_of_values is incremented in the step 514 to 2, the sub-process 800 in FIG. 8 is not executed. The step 730 in FIG. 7 adds the image data value 6 to the Palette 210 returning a palette value of 1. Both cases 2 and 3 are performed for that value run. As the parameter offset is now 20 and therefore greater than 0, the check performed in the step 905 in FIG. 9 leads to the step 910 which increments the parameter number_of_offsets to 1 and writes it into the Case 2 Header 1225 using 8 bits. The parameter offset's value of 20 is written in the step 915 in the Case 2 Data 1230 using 12 bits. The parameter number_of_offsets is less than 2, so image data value 6 is written in the Case 2 Header 1225 as Value 2 in the step 925 using 4 bits. The sub-process 1000, encoding Case 3, starts by checking (step 1010) if image data value 6 has just been added to the Palette 210 in the step 730 in FIG. 7. Since that is the case, the step 1015 writes the image value 6 in the Case 3 Header 1240 as Value 1 using 4 bits. The parameter pal_max_index, being the latest assigned palette value of 1, is written in the first nibble of the Case 3 Preamble 1235 using 4 bits. The Bit representation does not have to be increased (according to the decision step 1020) since 1 bit is sufficient to encode the palette value of 1. In the step 1035 in FIG. 10, the palette value of 1 is written in the Case 3 Data 1245 four times as the bit string '1' using the value of the current parameter max_num_bits of 1. Back in the sub-process 518, the step 740 increases the parameter offset by the run length of 4 to 24.

The next value run is (5, 40) and since the parameter number_of_values remains at 2 this value run is processed according to both cases 2 and 3 (with the steps 925, 1015, 1020, 1025 skipped as the parameter number_of_offsets is 2 and the parameter img_value is not new). The aforementioned process brings us to the end of the first row in the current tile with the parameter offset updated to 64 at the step 740. The next value run is (5, 10) and because the image data value is the same as the image value of the previous run (as determined in the check step 735), Case 2 encoding is skipped. Case 3, having skipped the steps 1015, 1020, and 1025 of the process 1000, proceeds in the step 1035 to encode the image data value 5 ten more times using the binary string '0' for its corresponding palette value since the parameter max_num_bits remains at 1. The offset is updated to 74 in the step 740.

The next value run of (4, 20) introduces a third image data value, so the parameter number_of_values goes to 3 at the step 514, and the tile cannot be encoded as a bi-value tile according to Case 2 any more (ie the check step 735 fails). From now on, only Case 3 is suitable for encoding the image data values in the tile, so that will be the encoding scheme for that tile chosen by the Encoding Selector 325.

As the parameter number_of_values is 3, 4's corresponding palette value of 2 (returned in step 730) is represented by the binary string '10' since the parameter max_num_bits is increased to 2 in the step 1025. From offset 74 onwards, palette values will be represented with at least two bits each. The 20 values in that run are encoded in the step 1035 as the binary string '10' for each value and at the step 740 the parameter offset is set to 94.

The next run is (6, 10) and it is again processed only for Case 3 in the sub-process 1000. The palette value of 6 (previously encountered in run 2) is 1, but now it is encoded as '01' in the step 1035 as the parameter max_num_bits is 2, so ten binary strings of '01' are written in the Case 3 Data 1245 in the step 1035.

The encoding proceeds in the same fashion until there are no more value runs to process for the current tile, a check performed continuously between value runs in the step 520.

At the end of processing value runs, it is clear that encoding has to be completed according to Case 3 as the tile contains more than two distinct image data values and neither of the two special cases is applicable (according to the step Select Encoding 525). The step 530 writes the Case 3 Preamble 1235, the Case 3 Header 1240 and the Case 3 Data 1245 to the Compressed RIP Output 375.

During decompression for this example, the Preamble read from Compressed RIP Output 375 identifies Case 3 as the encoding scheme. Therefore, the bit-stream is decoded according to Case 3 using the process 1100. Starting with bit representation of 1, seventy four 1-bit palette values are read until the bit representation has to be increased to 2 at offset 74. Then 20 strings of '10' are read, followed by 10 strings of '01' and the decompression proceeds in a similar fashion for the rest of the tile, increasing the current bit representation at each offset read from the Case 3 Header 1240 in the step 1120 until the value of the parameter max_num_bits from the Case 3 Preamble 1235 is reached.

Note that decompression is not concerned with the similarity of the decoded values themselves, and their size is the criterion for values to be decoded together. For example, the values for the original runs (5, 20), (6, 4), (5, 40) and (5, 10) are decoded together, as 1-bit palette values. Similarly, the last two runs in the example, (4, 20) and (6, 10), are decoded together as their bit representation is the same, i.e. two bits for each palette value. In that respect, compression and decompression can be seen as asymmetrical, as the value runs from compression do not get transformed into symmetrical value runs during decompression.

The ILE arrangements are general enough to be applicable to a wide range of data. For example, the compression method may be applied to a page of text by creating a palette of all ASCII characters (which are the 'image values') on the page and encoding the text on the page in a single pass. Each ASCII character on the page is given a corresponding palette value in the order it is encountered starting from 0. Similarly to the image data described above, three possible cases are constructed during compression. The Case 3 encoding scheme is the most likely encoding for most pages of text out of the three possible encoding schemes.

INDUSTRIAL APPLICABILITY

It is apparent from the above that the arrangements described are applicable to the data processing industries.

The foregoing describes only some embodiments of the present invention, and modifications and/or changes can be made thereto without departing from the scope and spirit of the invention, the embodiments being illustrative and not restrictive.

The invention claimed is:

1. A computer-implemented method of encoding a plurality of image values, the computer comprising a processor configured to implement the method and a storage device to store the encoded image values, said method comprising, for an image value:
   (a) determining a palette value for said image value, said palette value indexing said image value that defines a color for a pixel;
   (b) determining whether a number of distinct palette values up to and including said palette value is greater than a number of palette values that can be encoded using a predetermined number of bits, and if so:
      (i) incrementing said predetermined number of bits; and
      (ii) recording a position of said image value; and
   (c) encoding said palette value using the incremented number of bits.

2. The method of claim 1, further comprising, if said number of distinct palette values is equal to two, and said image value is different from a preceding image value, encoding the position of said image value.

3. The method of claim 2, further comprising encoding a plurality of positions, wherein each of said plurality of positions comprises an image value that is different from a preceding image value.

4. The method of claim 3, wherein said further encoding is carried out if a number of said plurality of positions is less than a threshold.

5. The method of claim 4, wherein said threshold is dependent on a size of an image represented by said image value.

6. The method of claim 1, further comprising:
   (a) encoding said recorded position; and
   (b) encoding said palette value using said incremented number of bits.

7. The method of claim 6, further comprising, after a final image value, encoding said number of distinct palette values.

8. The method of claim 6, further comprising encoding said number of bits.

9. A computer-implemented method of encoding a plurality of image values, the computer comprising a processor configured to implement the method, and a storage device to store the encoded image values, said method comprising, for a current image value, the steps of:
   (a) determining, if the current image value is new to a palette, whether a palette value for the current image value can be represented by a number of bits representing the palette, said palette value indexing said current image value that defines a color for a pixel;
   (b) if the step (a) is false, executing the steps of:
      (i) incrementing the number of bits representing the palette; and
      (ii) identifying a position of the current image value; and
   (c) encoding said palette value for the current image value using the incremented number of bits.

10. An apparatus for encoding a plurality of image values, said apparatus comprising, in relation to an image value:
   a memory for storing a program; and
   a processor for executing the program, said program comprising:
   (a) code for determining a palette value for said image value, said palette value indexing said image value that defines a color for a pixel;
   (b) code for determining whether a number of distinct palette values up to and including said palette value is greater than a number of palette values that can be encoded using a predetermined number of bits, and code for, if so:
      (i) incrementing said predetermined number of bits; and
      (ii) recording a position of said image value; and
   (c) code for encoding said palette value using the incremented number of bits.

11. An apparatus for encoding a plurality of image values, said method comprising, in relation to a current image value:
   a memory for storing a program; and
   a processor for executing the program, said program comprising:
   (a) code for determining, if the current image value is new to a palette, whether a palette value for the current image value can be represented by a number of bits representing the palette, said palette value indexing said current image value that defines a color for a pixel;

(b) code for, if the step (a) is false:

(i) incrementing the number of bits representing the palette; and (ii) identifying a position of the current image value; and (c) code for encoding said current image value using the incremented number of bits.

12. A computer readable storage device having recorded thereon a computer program for directing a processor to execute a method for encoding a plurality of image values, said program comprising in relation to an image value:

(a) code for determining a palette value for said current image value, said palette value indexing said image value that defines a color for a pixel;

(b) code for determining whether a number of distinct palette values up to and including said palette value is greater than a number of palette values that can be encoded using a predetermined number of bits, and code for, if so:

(i) incrementing said predetermined number of bits; and (ii) recording a position of said image value; and (c) code for encoding said palette value using the incremented number of bits.

13. A computer readable storage device having recorded thereon a computer program for directing a processor to execute a method for encoding a plurality of image values, said program comprising, in relation to a current image data value:

(a) code for determining, if the current image value is new to a palette, whether a palette value for the current image value can be represented by a number of bits representing the palette, said palette value indexing said current image value that defines a color for a pixel;

(b) code for, if the step (a) is false:

(i) incrementing the number of bits representing the palette; and (ii) identifying a position of the current image value; and (c) code for encoding said current image value using the incremented number of bits.

* * * * *